March 14, 1944.    J. J. LOW    2,343,872
LOGGING TRAILER
Filed Dec. 17, 1941    2 Sheets-Sheet 1

Inventor
JOHN J. LOW
By Edwin D. Jones.
Attorney

March 14, 1944.   J. J. LOW   2,343,872
LOGGING TRAILER
Filed Dec. 17, 1941   2 Sheets-Sheet 2

Inventor
JOHN J. LOW
By Edwin D. Jones
Attorney

Patented Mar. 14, 1944

2,343,872

UNITED STATES PATENT OFFICE 2,343,872

LOGGING TRAILER

John J. Low, Los Angeles, Calif., assignor to Kay-Brunner Steel Products, Inc., a corporation of Delaware Application December 17, 1941, Serial No. 423,327

5 Claims. (Cl. 280—81)

My invention relates to vehicles of the heavy duty type for carrying heavy loads, and it has particular reference, although not necessarily, to logging trailers adapted to be drawn by a truck or tractor. Such trailers as heretofore proposed comprise a frame supported at its rear end by a single truck having two long axles extending across the frame with four dual tire wheels one on each end of each axle, and springs fixed to the frame and disposed between the axles and the frame. Trailers as so constructed provide rigid and inflexible structure which is unyielding to turning movements of the trailer so that the wheels are forced to describe the same paths, causing lateral skidding of the tires and thus producing excessive tire wear.

Another and greater disadvantage of prior logging trailers, is the wheels cannot accommodate themselves to unevenness in a roadway so that the full load of the trailer and the logs thereon is caused to be imposed on one wheel tire or another to form deep ruts in the roadway which increases road maintenance and imposes additional wear on the side walls of the tires.

It is a purpose of my invention to provide a trailer having a truck construction characterized by its flexibility to allow the wheels to accommodate themselves to irregularities in a roadway and thus eliminate the disadvantages attendant immovably mounted wheels, and, further when making turns to allow the wheels to describe individual paths and thus prevent lateral skidding of the tires.

Another purpose of my invention is the provision of a logging trailer embodying a multiplicity of wheels mounted on axles which are pivoted on springs to swing about axes longitudinally of the trailer frame, and wherein the springs are pivoted transversely on the trailer frame to allow the wheels to move through vertical arcs, whereby a truck construction of the requisite flexibility is provided to accomplish the aforestated advantages.

Another purpose of my invention is the provision in a logging trailer, of a truck construction which embodies at least 8 wheels, and by the aforestated flexible mounting of which, a greater distribution of load over the vehicle and to the roadway is effected, thereby greatly reducing the load on each individual tire or wheel, and thus prolonging the life of the tires.

A still further purpose of my invention is the provision of a logging trailer of the above described character, wherein the multiplicity of wheels are mounted in pairs, with the wheels of each pair spaced one from the other to render the tire for each wheel readily accessible for removal, without disturbing the adjacent tire, and wherein each wheel is provided with a brake having an actuating means common to the brakes for the pair of wheels.

I will describe only one form of logging trailer embodying my invention, and will then point out the novel features thereof in claims.

In the accompanying drawings.

Similar reference characters refer to similar parts in each of the several views.

Figure 1:
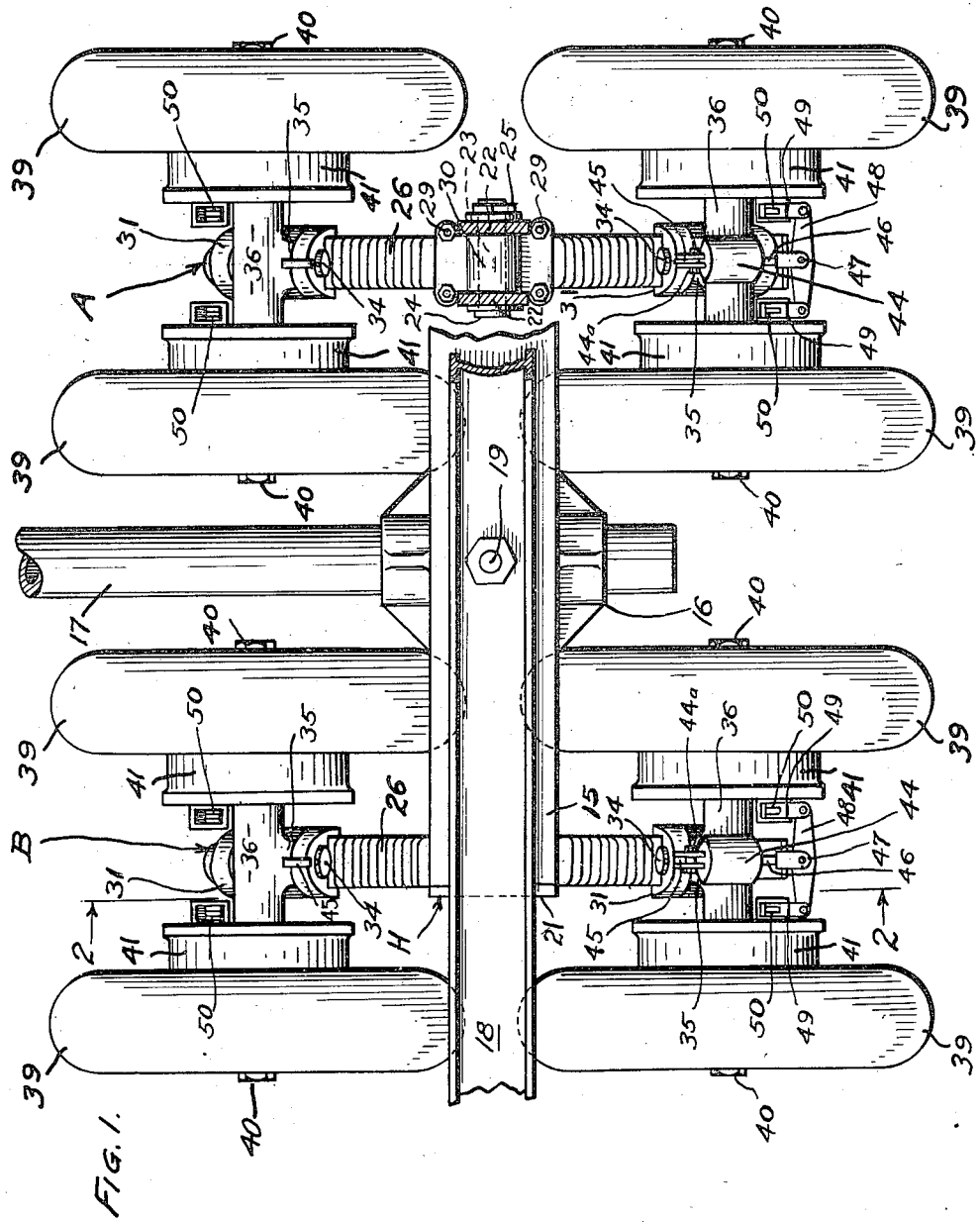
Fig. 1 is a view showing in top plan the rear of a logging trailer embodying one form of my invention.
Figure 2:
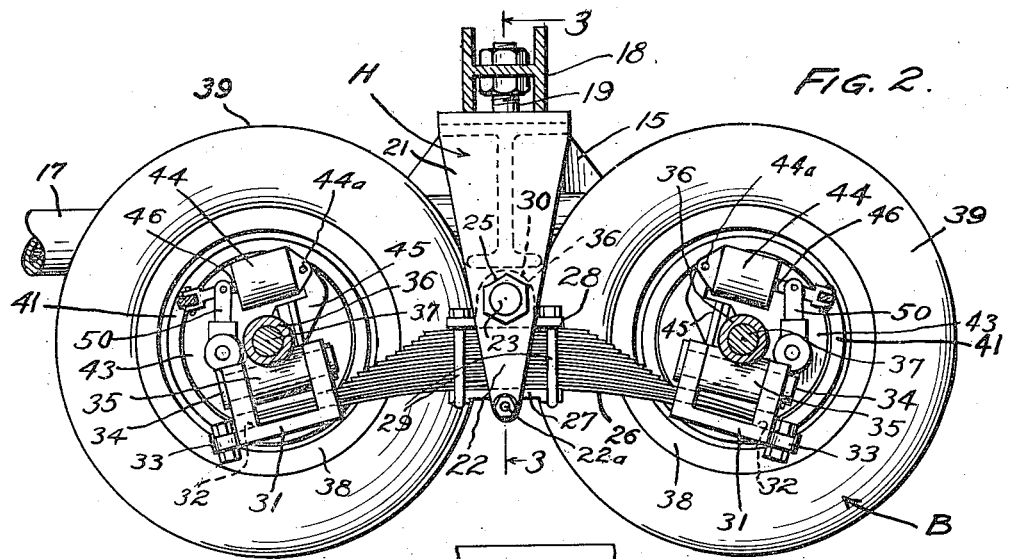
Fig. 2 is a vertical sectional view, on a reduced scale, and taken on the line 2—2 of Fig. 1.

Referring specifically to the drawings, the logging trailer is shown as comprising a frame which, as in trailers for logging purposes, includes a transverse bolster 15 which may be of the construction shown in Fig. 2, and provided with a depending clamp 16 for receiving the rear end of a reach pipe 17. The forward end of the reach rod, as usual, is adapted for connection to the rear end of a truck or tractor by which the trailer is drawn.

Superimposed on the bolster 15 is a beam 18 removably secured thereto by a pin 19 extending into a socket 20. Upon this beam the rear ends of the logs are adapted to be supported, the front ends of the logs being supported on a similar beam (not shown) mounted on the rear end of the tractor or truck.

Two trucks A and B are connected to the trailer frame at opposite ends of the bolster 15, and as these trucks are identical in construction, a description of one will suffice for both. Each truck includes a hanger H having a box-like upper structure 21 secured to the end of the bolster 15, and an integral lower structure which has depending and spaced plates 22 connected at their lower ends by a bolt 22a.

Extending transversely through the plates 22 (Fig. 3) is a pin 23 having a head 24 on its inner end and a nut 25 threaded on its outer end for securing the pin in the plates. Extending between the plates below the pin is a medial portion of a leaf spring 26 the leaves of which are secured together by a clip having a lower plate 27 connected to an upper plate 28 by U-bolts 29. The upper plate 28 is provided with a bearing sleeve 30 through which the pin 23 extends to provide a pivotal mounting for the spring 26 which is disposed transversely of the trailer and about which the spring can rock.

On each end of the spring 26 is a clevis 31, the parallel portions of which are formed with slots 32 (Fig. 4) receiving the end portions of certain of the spring leaves, and the end of the master leaf bolted to an ear 33 formed on the clevis and by which the clevis is secured permanently to the spring.

Figure 3:
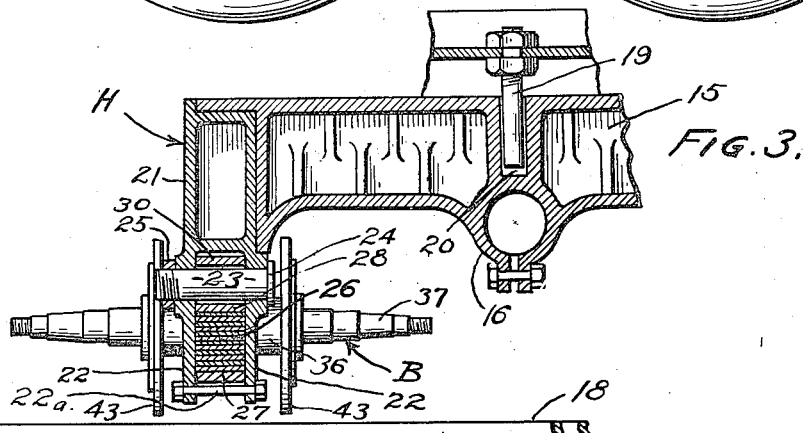
Fig. 3 is a fragmentary vertical sectional view taken on the line 3—3 of Fig. 2, with the reach pipe omitted and with the axles devoid of the wheels.

Through the parallel portions of the clevis 31 extends a pin 34 headed at both ends to secure it within said portions, and on which a sleeve 35 is rotatably fitted. Fixed to and extending transversely of the sleeve 35 is a second sleeve 36 through which extends and in which is secured an axle 37. This axle may be constructed as shown in Fig. 3 to provide two axles one for each of a pair of wheels 38 (Fig. 4) which may carry pneumatic tires 39.

The aforedescribed arrangement of pin, sleeves, and axle provides a mounting for the wheels on the ends of the spring by which they can in pairs rock about the pin 34 as a center. Because the pin is disposed lengthwise of the trailer frame and the axle is at right angles to the pin, the plane of movement of the wheels is transversely of the trailer frame. This is in contradistinction to the pivotal mounting of the spring on the hanger, which permits rocking movement of the spring in a plane longitudinally of the trailer frame so as to in turn allow the two axles to move through vertical arcs. Thus it will be clear that the mounting on the trailer frame of each truck is such that each pair of wheels can rock simultaneously in two vertical planes, one of which is transversely of the trailer frame and the other longitudinally of the trailer frame.

Where each of the trucks are so mounted, they can move relative to each other about the pins 23 as centers, while at the same time the forward and rearward pairs of wheels of each truck can move relative to each other. In this manner surface irregularities both longitudinally and transversely of a road, are accommodated for, and because of there being on each axle two wheels spaced one from the other, and four axles totaling eight wheels, not only is the load carried by the trailer substantially evenly distributed among all the wheels, but the load imposed on each individual wheel or tire, is lessened. This load distribution produces road ruts of less depth which in turn, reduces side wall tire wear, and road maintenance, and also, reduces the power necessary to move the load.

When the trailer is making turns the mounting of the wheels by reason of the pivoted axles, allows the rear pairs of wheels to describe paths different from the front pairs of wheels thus preventing lateral skidding of the tires and thereby reducing tire wear.

By embodying in each truck a spring providing a resilient connecting medium between the axles and the trailer frame, as well as providing a pivotal connection for the axles transversely of the trailer frame, in any of the many positions which the wheels may assume, the load is always resiliently supported, which reduces shock load on the tires and the frame as well as the intervening connections.

Figure 4:
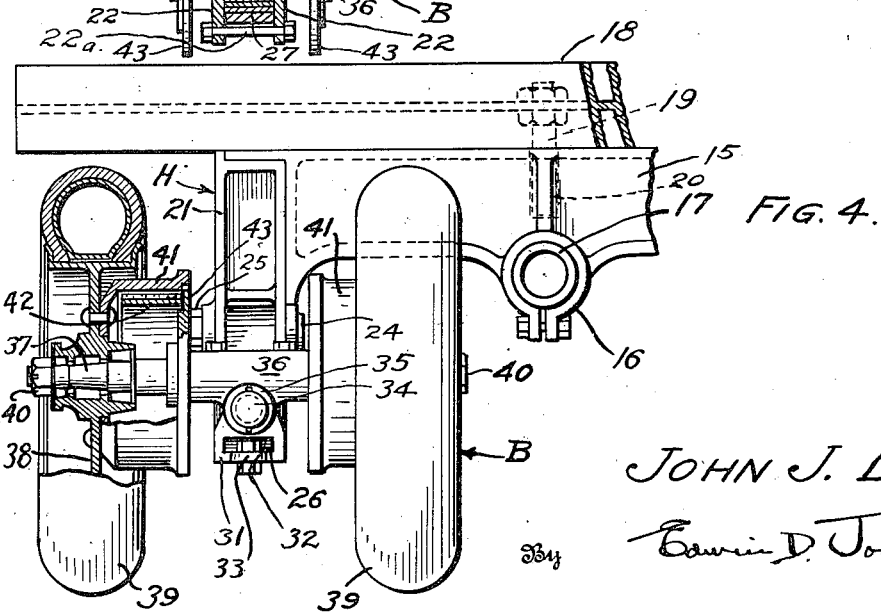
Fig. 4 is a fragmentary view showing the trailer in rear elevation and partly in section.

As best shown in Fig. 4, each wheel 38 is journaled on its respective axle 37, and secured thereon by a nut 40. Secured to the inner side of the wheel is a brake drum 41 which is engageable by brake shoes 42 mounted on a disk 43 fixed to the axle 37 and closing the inner side of the drum. The shoes 42 are operable to engage the drum by an actuating means which is common to the shoes of the brakes for both wheels of that pair. This actuating means may comprise a hydraulic cylinder 44 pivoted at one end as at 44a on a bracket 45 secured to the sleeve 36. A piston operates within the cylinder, and the rod 46 thereof is pivoted as at 47 to rocker arm 48. The ends of the arm 48 are connected by links 49 to arms 50 fixed to the cams (not shown) for expanding the brake shoes for both brakes.

It will be understood that the four cylinders 44 for the eight brakes, are adapted to be supplied with pressure fluid from a master cylinder to effect brake applications simultaneously to all eight wheels.

While the combined braking action of the eight brakes is wholly adequate for stopping the trailer under the most adverse circumstances, the greatest advantage provided is that the brake drums individually may be of relatively small diameter, thus reducing the possibility of overheating.

The spacing of the wheels of each pair renders the braking mechanism therefor readily accessible for lubrication and repair, and also permits either tire to be demounted without demounting the other tire.

Although I have herein shown and described only one form of logging trailer embodying my invention, it is to be understood that various changes and modifications may be made herein, without departing from the spirit of my invention and spirit and scope of the appended claims.

I claim:

1. In a wheeled vehicle; a frame; a hanger depending from said frame; a leaf spring pivotally mounted medially of its ends in said hanger to swing about an axis transversely of said frame; clevises fixed to and rising from the ends of said spring; pins in said clevises disposed lengthwise of said spring; sleeves rotatable on said pins; other sleeves above and fixed to the first mentioned sleeves at right angles thereto; axles in said other sleeves; and wheels journaled on the ends of said axles so as to be disposed at opposite sides of said spring.

2. In a wheeled vehicle; a frame; a hanger depending from said frame; a leaf spring pivotally mounted medially of its ends in said hanger to swing about an axis transversely of said frame; a pair of clevises at the ends of said spring; each clevis of U-form and having its bight portion fixed to said spring, and having the parallel portions thereof slotted to receive certain of the leaves of said spring; pins in said clevises disposed lengthwise of said spring; sleeves rotatable on said pins; other sleeves above and fixed to the first mentioned sleeves at right angles thereto; axles in said other sleeves; and wheels journaled on the ends of said axles so as to be disposed at opposite sides of said spring.

3. In a logging trailer, a bolster, hangers at the ends of said bolster, springs pivotally mounted between their ends in said hangers to swing about axes longitudinally of said bolster, clevises secured to the ends of said springs, pins in said clevises and transversely of said bolster, sleeves rotatable on said pins, other sleeves fixed to and transversely of the first mentioned sleeves, axles carried by said other sleeves, wheels on the ends of said axles, brake drums fixed to the confronting sides of said wheels, sets of brake shoes mounted on said axles, one set for each of said drums, and a plurality of brake shoe actuating means each mounted on one of said other sleeves and operatively connected to both sets of brake shoes for the brake drums of that confronting pair.

4. In a wheeled vehicle; a frame; a hanger depending from said frame; a pair of axles disposed transversely of said frame; wheels on both ends of said axles; a single leaf spring for suspending the said axles and said wheels from said hanger; said spring pivotally mounted medially of its ends in said hanger so as to be disposed longitudinally of said frame; and means for mounting said axles on the ends of said spring for transverse pivotal movement about axes lonitudinally of said spring and in fixed relation to the ends of said spring.

5. In combination; a spring; a clevis on one end of said spring; a sleeve carried by said clevis; a bracket secured to said sleeve; a hydraulic cylinder pivoted on said bracket; a piston in said cylinder having a rod; an axle secured within said sleeve; a pair of wheels on said axle; brake drums secured to said wheels; brake shoes on said axle; and an operative connection between said rod and said brake shoes.

JOHN J. LOW.